(12) United States Patent
Babymony

(10) Patent No.: US 12,291,282 B2
(45) Date of Patent: May 6, 2025

(54) TAILGATE EXTENSION SYSTEM FOR A VEHICLE

(71) Applicants: Hyundai Motor Company, Seoul (KR); Kia Corporation, Seoul (KR)

(72) Inventor: Manikandan Babymony, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 331 days.

(21) Appl. No.: 17/969,342

(22) Filed: Oct. 19, 2022

(65) Prior Publication Data
US 2024/0132162 A1  Apr. 25, 2024
US 2024/0227950 A9  Jul. 11, 2024

(51) Int. Cl.
*B62D 33/027* (2006.01)
(52) U.S. Cl.
CPC ................ *B62D 33/0273* (2013.01)
(58) Field of Classification Search
CPC ....... B62D 33/0273; B62D 33/08; B60P 3/40; B60Y 2200/141
See application file for complete search history.

(56) References Cited

U.S. PATENT DOCUMENTS

| 7,712,811 | B2 * | 5/2010 | Heaman | B62D 33/0273 296/62 |
| 10,308,292 | B1 * | 6/2019 | Shedden | B62D 33/0273 |
| 2005/0212317 | A1 * | 9/2005 | Kobylski | B60P 1/003 296/26.09 |
| 2005/0285422 | A1 * | 12/2005 | Bartos | B60R 5/04 296/26.09 |
| 2006/0145498 | A1 * | 7/2006 | Bartos | B60P 3/40 296/26.09 |
| 2009/0273202 | A1 * | 11/2009 | Heaman | B62D 33/0273 296/26.1 |

* cited by examiner

*Primary Examiner* — Lori Lyjak
(74) *Attorney, Agent, or Firm* — Fox Rothschild LLP

(57) ABSTRACT

Methods, devices, and systems are described for extending a tailgate length. The system includes a tailgate frame configured to fold down to an open position. In one aspect, the system includes an upper frame integrated into the tailgate frame. The upper frame includes a cross member configured to extend across the tailgate frame from the first end to the second end. The system includes at least one side rail configured to couple to at least one of the first end and the second end of the cross member. The at least one side rail is oriented approximately perpendicular to the cross member. The system includes a tailgate extender configured to deploy from the tailgate frame to extend the tailgate length. The tailgate extender is configured to be supported by the at least one side rail and includes a moving roller configured to move along the at least one side rail.

19 Claims, 14 Drawing Sheets

TAILGATE EXTENSION SYSTEM FOR A VEHICLE

TECHNICAL FIELD

The present disclosure generally relates to vehicles, and more particularly, to a tailgate extension system for a vehicle.

BACKGROUND

Vehicle beds carry cargo of various weights and sizes. But sometimes, vehicle beds are not sufficiently large to carry cargo having dimensions greater than the dimensions of the vehicle bed. In such instances, a tailgate may be used to extend the length of the vehicle bed. Tailgates are a common feature on trucks that make securing the cargo of various sizes and shapes easier. Tailgates fold outwards from the truck and often align with the floor of the truck in a horizontal configuration. But this outward folding may not be long enough to carry loads having dimensions longer than the length of the vehicle bed and the tailgate. Currently, consumers have to find alternative trucks when the length of the vehicle bed and tailgate is not sufficiently long.

SUMMARY

The present disclosure provides methods, systems, articles of manufacture, a folding tailgate.

In one aspect, a vehicle tailgate extension system is provided for extending a tailgate length, the tailgate extension system comprising: a) a tailgate frame configured to fold down to an open position; and b) a tailgate extender configured to deploy from the tailgate frame, the tailgate extender comprising a roller unit configured to deploy the tailgate extender from the tailgate frame.

In one aspect, a vehicle tailgate extension system is provided for extending a tailgate length, the tailgate extension system comprising: a) a tailgate frame configured to fold down to an open position; and b) a tailgate extender configured suitably to deploy from a tailgate frame and suitably to extend the tailgate length, the tailgate extender configured to be supported by at least one side rail and including a moving roller configured to move along the at least one side rail to deploy the tailgate extender from the tailgate frame.

In one aspect, there is provided a vehicle tailgate extension system including a tailgate frame configured to fold down to an open position. The system suitably includes an upper frame integrated into the tailgate frame. The upper frame suitably includes a cross member having a first end and a second end. The cross member is suitably configured to extend across the tailgate frame from the first end to the second end. The system suitably includes at least one side rail configured to couple to at least one of the first end and the second end of the cross member. The at least one side rail is suitably oriented approximately perpendicular to the cross member. The system includes a tailgate extender configured to deploy from the tailgate frame to extend the tailgate length. The tailgate extender is suitably configured to be supported by the at least one side rail and includes a moving roller configured to move along the at least one side rail to deploy the tailgate extender from the tailgate frame.

In some variations, the tailgate extender is suitably configured to extend out of the tailgate frame as the moving roller moves along the at least one side rail. Further, the at least one side rail suitably includes a fixed roller configured to support deployment of the tailgate extender, the fixed roller being positioned at an outer end of the at least one side rail closest to where the tailgate extender is configured to deploy. Additionally, the tailgate extender suitably further comprises a latch for securing the tailgate extender to the at least one side rail in a deployed position and a retracted position.

Additionally, the at least one side rail further suitably comprises a first striker configured to engage with the latch for securing the tailgate extender to the at least one side rail in the retracted position, the first striker situated at an inner end of the at least one side rail, the inner end situated further away from where the tailgate extender is configured to deploy. Further, the at least one side rail further suitably comprises a second striker configured to engage with the latch to secure the tailgate extender in the deployed position, the second striker being situated proximate to an outer end of the at least one side rail, the outer end opposite the inner end on the at least one side rail, and a stopper with a spring retention feature configured to dampen movement of the tailgate extender as the tailgate extender moves to the retracted position, the stopper being situated proximate to the inner end of the at least one side rail.

In some variations, the tailgate extension system suitably further comprises the at least one side rail has a c-channel structure configured to receive the moving roller coupled to the tailgate extender. Further, the upper frame further suitably comprises a rear cross member configured to extend from the first end to the second end of the cross member, and at least one internal beam configured to couple the cross member to the rear cross member, wherein the rear cross member is configured to couple to the at least one side rail.

In some variations, the system suitably further comprises a pop-up spring configured to exert a force on the tailgate extender to move the tailgate extender a distance in response to pulling on a handle when the tailgate frame is folded down in the open position. In some variations, the at least one side rail further comprises a bracket for mounting the at least one side rail to the upper frame.

In some variations, the tailgate extender suitably further comprises a handle coupled to a cable configured to disengage a latch in response to the handle being pulled. Additionally, in certain designs, the cable is suitably configured to disengage the latch from a pin in response to the handle being pulled. Further, the handle is suitably situated on a top side of the tailgate frame when the tailgate frame is in an upright position. In some embodiments, the system further comprises a lid configured to prevent at least one of snow, dust, and water accumulation at the handle and a handle casing configured to control water entry and exit at the tailgate extension system.

In another aspect, there is a tailgate extension device suitably including an upper frame configured to be integrated into the tailgate frame. The upper frame suitably includes a cross member having a first end and a second end. The system suitably includes configured to couple to at least one of the first end and the second end of the cross member. The at least one side rail is oriented approximately perpendicular to the cross member. The system suitably includes a tailgate extender configured to deploy from the upper frame. The tailgate extender is configured to be supported by the at least one side rail and includes a moving roller configured to move along the at least one side rail to deploy from the upper frame.

In some variations, the tailgate extender is suitably configured to extend out of the upper frame as the moving roller moves along the at least one side rail. Further, the at least one side rail includes a fixed roller configured to support deployment of the tailgate extender, the fixed roller being positioned at an outer end of the at least one side rail closest to where the tailgate extender is configured to deploy. Additionally, the tailgate extender suitably further comprises a latch for securing the tailgate extender to the at least one side rail in a deployed position and a retracted position.

Additionally, the at least one side rail suitably further comprises a first striker configured to engage with the latch for securing the tailgate extender to the at least one side rail in the retracted position, the first striker situated at an inner end of the at least one side rail, the inner end situated further away from where the tailgate extender is configured to deploy. Further, the at least one side rail suitably further comprises a second striker configured to engage with the latch to secure the tailgate extender in the deployed position, the second striker being situated proximate to an outer end of the at least one side rail, the outer end opposite the inner end on the at least one side rail, and a stopper with a spring retention feature configured to dampen movement of the tailgate extender as the tailgate extender moves to the retracted position, the stopper being situated proximate to the inner end of the at least one side rail.

In further aspects, vehicles are provided that comprise a tailgate and/or tailgate extension device as disclosed herein. as disclosed herein. In one aspect, a vehicle has a tailgate. In one aspect, the vehicle is a truck. In one aspect, the vehicle is a pick-up truck.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figures 1A, 1B:
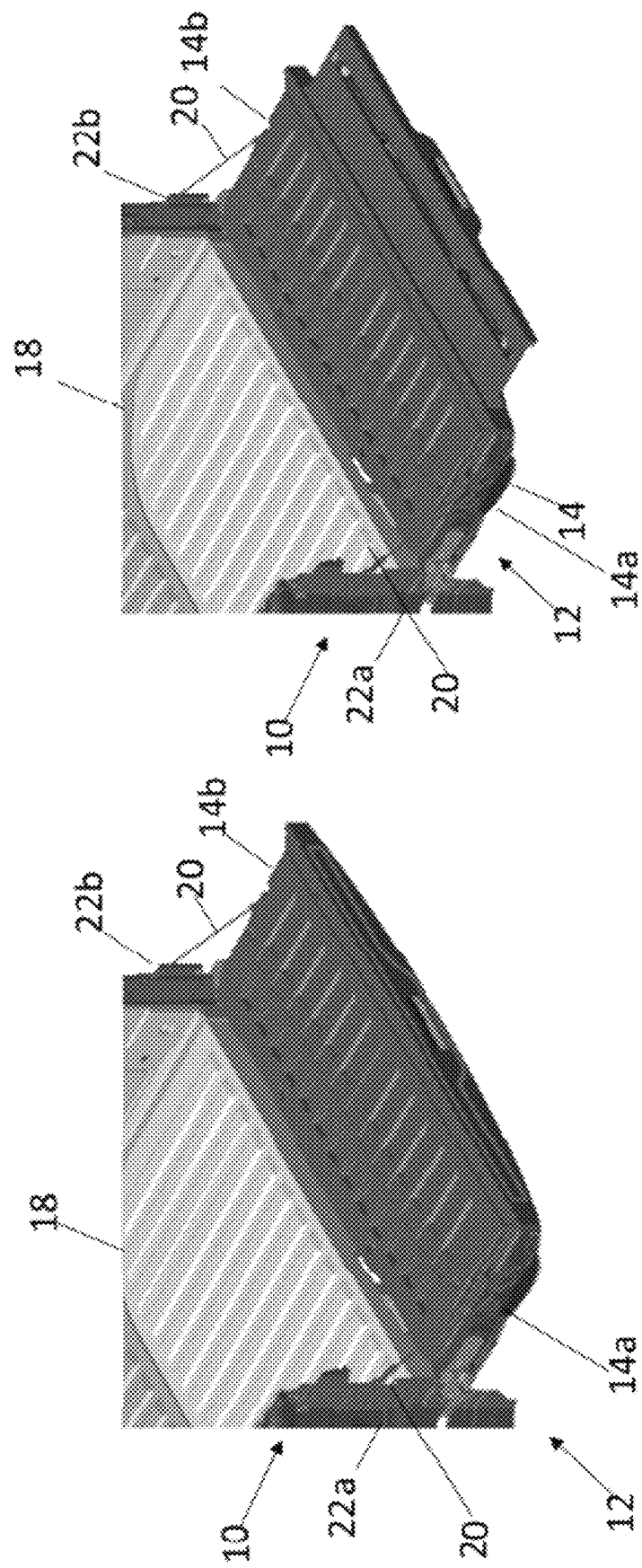
FIG. 1A depicts an example of a diagram representative of a tailgate extension system integrated into a tailgate.
FIG. 1B depicts an example of a drawing representative of a tailgate extension system in a deployed position.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

According to the present disclosure, a tailgate of a vehicle may include a tailgate extension system configured to extend the length of the tailgate. The tailgate extension system may deploy from the tailgate when the tailgate is in a horizontal position to extend the length of a vehicle bed. The tailgate extension system may extend the length of the vehicle bed. The tailgate extension device allows a vehicle to carry cargo that exceeds the dimensions of the vehicle bed with the tailgate in the upright position. The tailgate extension system includes the tailgate extender that extends out past the end of the tailgate. The tailgate extender may support a load having dimensions that exceed the dimensions of the vehicle bed with the tailgate in an upright position. In comparison to typical tailgates, the tailgate extension system may increase the size of the vehicle bed and may support heavy loads.

The tailgate extension system may include a tailgate frame that is configured to fold down to an open position. From the open position, the size of the vehicle bed may be increased and a user may more easily access the contents of the vehicle bed. The tailgate extension system may be integrated into the tailgate. The tailgate extension system may include an upper frame integrated into the tailgate frame. The upper frame may include a cross member having two ends with a side rail at each end. The upper frame may provide a housing for the tailgate extender and a structural support for the tailgate extender. The side rail at each end of the cross member of the upper frame may enable the tailgate extender to deploy. The side rail may guide the tailgate extender from the retracted position to the deployed position.

The side rail may include a moving roller that is configured to move along the side rail to deploy the tailgate extender from the tailgate frame. The tailgate extender may be configured to extend out of the tailgate frame as the moving roller moves along the at least one side rail. The side rail may include a fixed roller that is configured to support deployment of the tailgate extender. The fixed roller may be positioned at an outer end of the at least one side rail proximate to the portion of the tailgate frame from which the tailgate extender is configured to deploy.

The side rail may also include several features to control the sliding of the tailgate extender. For example, the side rail may include strikers configured to engage with a latch for securing the tailgate extender to the tailgate frame in a retracted position and a deployed position. In another example, the side rail may include a stopper with a spring retention feature configured to dampen movement of the tailgate extender as the tailgate extender moves to the retracted position. The side rail may have a c-channel structure configured to receive the moving roller coupled to the tailgate extender.

A handle may be used to deploy the tailgate extender from the tailgate extension system. The handle may be situated on a top side of the tailgate frame when the tailgate frame is in an upright position. The handle may be coupled to a cable. The cable may be configured to disengage a latch in response to the handle being pulled. The cable suitably may be configured to disengage the latch from a pin in response to the handle being pulled. In some embodiments, a pop-up spring may be configured to exert a force on the tailgate extender to move the tailgate extender a distance in response to pulling on the handle. In some embodiments, the handle may have a lid configured to prevent at least one of snow, dust, and water accumulation at the handle. The handle may also include a handle casing configured to control water entry and exit at the handle.

The methods, systems, and apparatuses described herein extend a dimension of a tailgate for extending the length of a vehicle bed. The various embodiments may also enable a pop-up spring configured to exert a force on the tailgate extender to move the tailgate extender.

FIGS. 1A and 1B depict a representative tailgate extension system 10 integrated into a tailgate 12. The tailgate extension system may include a tailgate frame 14. The tailgate frame may be configured to fold down to an open position as depicted in FIG. 1A where the length of tailgate 14 is substantially parallel with a ground surface.to. The tailgate frame 14 may be aligned with the bed 18 of the vehicle in the open horizontal position. The tailgate frame 14 may be supported by one or more cables 20 for example connecting to a left wall 22*a* and a right wall 22*b* of the vehicle and respective left wall 14*a* and 14*b* of tailgate frame 14. The tailgate frame may rotate at the bottom such that the bottom portion of the tailgate is proximate to the back portion of the vehicle bed. The tailgate extension system may be integrated into the tailgate. The tailgate extension system may be retracted into the tailgate.

FIG. 1B depicts an example of a drawing representative of a tailgate extension system in a deployed position. The tailgate extension system may be deployed when the tailgate is in the open horizontal position. The tailgate extension system may deploy at a far side of the tailgate. For example, the tailgate extension system may deploy from the portion of the tailgate furthest from the vehicle bed. Additionally, and/or alternatively, the tailgate extension system may be deployed when the tailgate is in an upright position.

Figure 2B:
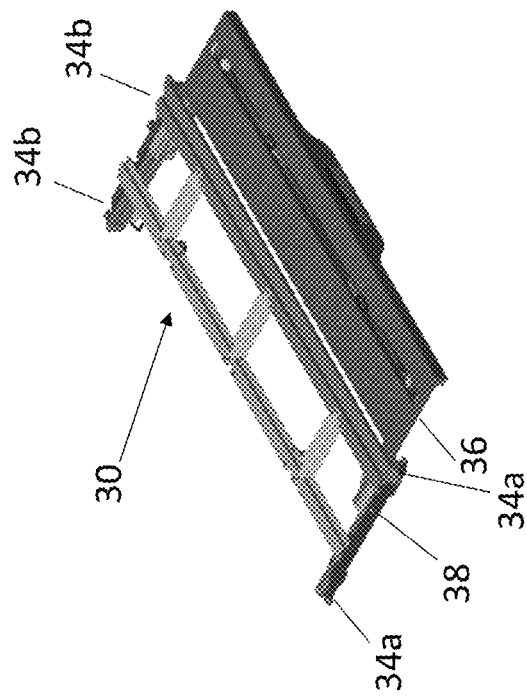
FIG. 2B depicts an example of an assembled view of a drawing representative of a tailgate extension system.
Figure 2A:
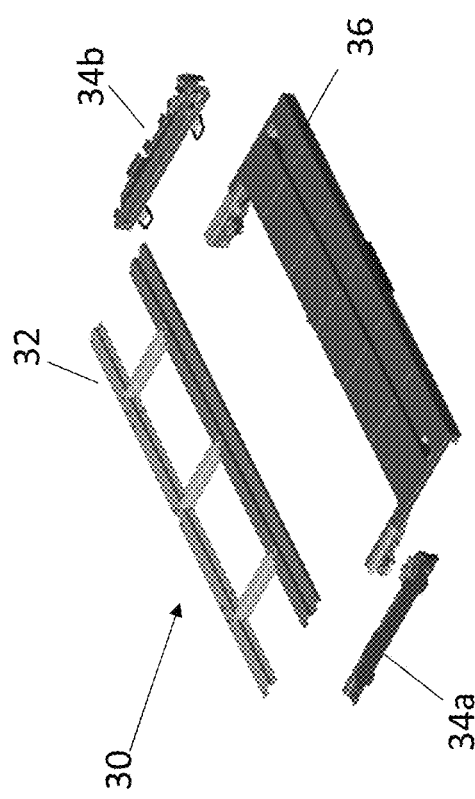
FIG. 2A depicts an example of an exploded view of a diagram representative of a tailgate extension system.

FIG. 2A depicts an example of an exploded view of a diagram representative of a tailgate extension system 30. The tailgate extension system may include an upper frame 32, side rails 34*a* and 34*b*, and a tailgate extender 36.

The tailgate extension system may include an upper frame integrated into the tailgate frame. The upper frame may include a cross member configured to extend across the tailgate frame from the first end to the second end. At one or both ends of the cross member, a side rail may be coupled to the cross member. The side rail may be oriented approximately perpendicular to the cross member. The cross member may be configured to house the tailgate extender when the tailgate extender is in the retracted position. The cross member may be configured to support the load on the tailgate. The first end and the second end of the tailgate frame may correspond to the first end and the second end of the cross member.

The upper frame may include two or more cross members configured to extend across the tailgate frame from the first end to the second end. The two or more cross members may include internal beams that couple the two or more cross members together. The two or more cross members may couple to a side rail at the first end and/or the second end of the two or more cross members. The side rail may be oriented approximately perpendicular to the cross members. The two or more cross members may be configured to house the tailgate extender when the tailgate extender is in the retracted position. The two or more cross members may be configured to support the load on the tailgate. The first end and the second end of the tailgate frame may correspond to the first end and the second end of the two or more cross members.

The tailgate extension system may include side rails. The side rails may be situated at one or both ends of the cross member. The side rail may be oriented approximately perpendicular to the cross member. In some embodiments, the side rail may be approximately the length of the tailgate extender. In some embodiments, the side rail may have a c-channel structure.

The tailgate extension system may include a tailgate extender. The tailgate extender may be configured to deploy from the tailgate frame to extend the tailgate length. The tailgate extender may be configured to slide along the side rails and to be supported by the side rails. The tailgate extender may include a moving roller. The moving roller may be configured to move along the side rails to deploy the tailgate extender from the tailgate frame. In some embodiments, the tailgate extender may include a latch for securing the tailgate extender to the side rail in a deployed position and a retracted position.

FIG. 2B depicts an example of an assembled view of a drawing representative of a tailgate extension system 30. In the retracted position, the moving roller 38 of the tailgate extender 36 may be at the portion of the side rail 34a, 34b closest to the vehicle bed. In the deployed position, the moving roller of the tailgate extender may be at the portion of the side rails furthest from the vehicle bed. The tailgate extender may be configured to extend out of the tailgate frame as the moving roller moves along the side rails 34a, 34b.

Figure 3:
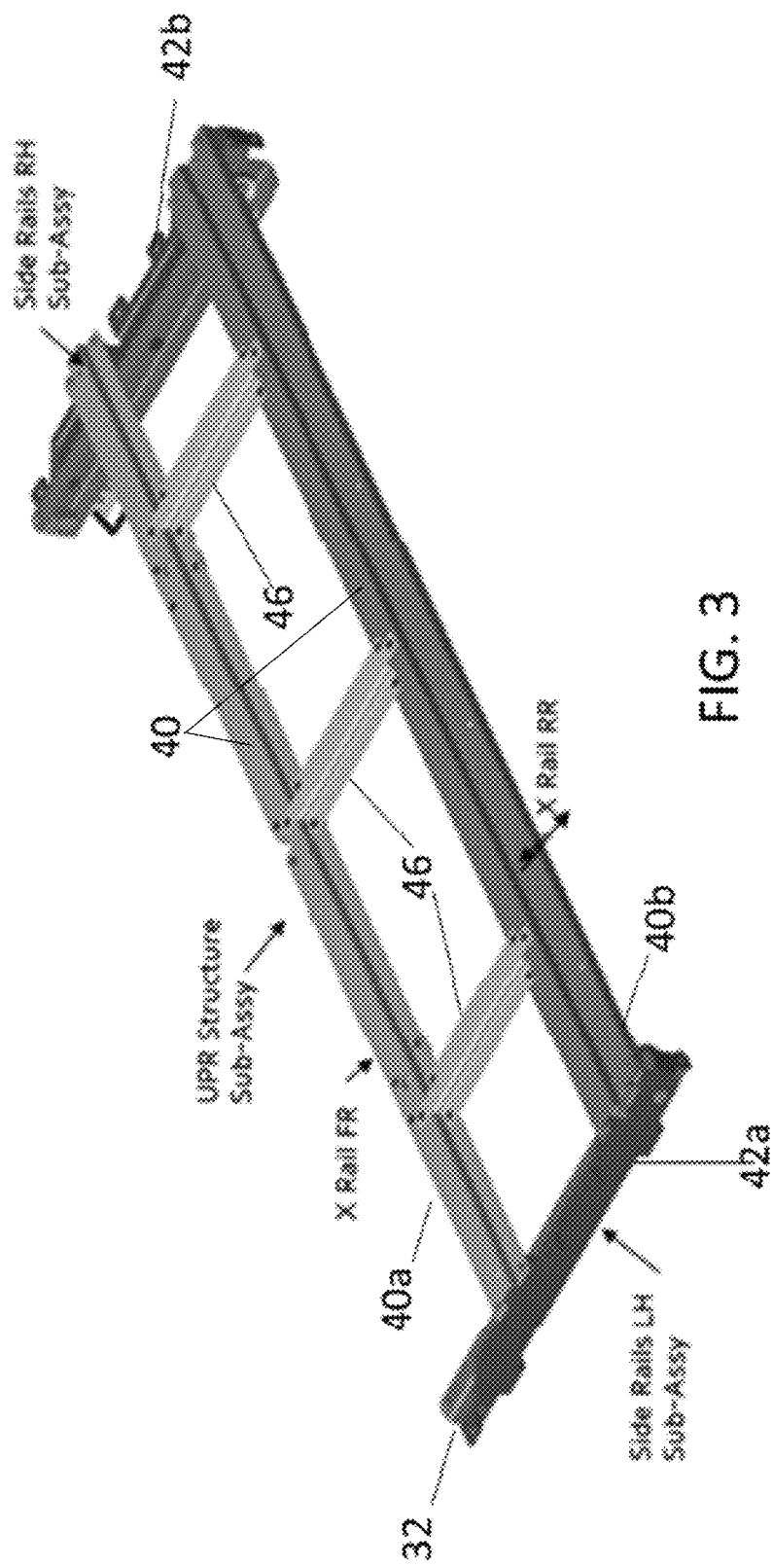
FIG. 3 depicts an example of a diagram representative of an upper frame of a tailgate extension system.

FIG. 3 depicts an example of a diagram representative of an upper frame 32 of a tailgate extension system. The cross members 40 may include a front cross member 40a and a rear cross member 40b. The front cross member 40a may be the closest to the front of the vehicle and the rear cross member 40b may be the closest to the rear of the vehicle. The left side rail 42a may correspond to the left side of the tailgate frame. The right side rail 42b may correspond to the right side of the tailgate frame. The internal beams 46 configured to couple the cross members together may be approximately perpendicular to the cross members. In some embodiments, the rear cross member may be connected to the outer end of the side rail. The outer end of the side rail may be the portion of the side rail closest to where the tailgate extender is configured to deploy. The inner end of the side rail may be opposite the outer end of the side rail. That is, the inner end of the side rail may be the portion of the side rail furthest from where the tailgate extender is configured to deploy. The rear cross member may couple to the outer portion of the side rail and the front cross member may couple to the inner portion of the side rail.

Figure 4:
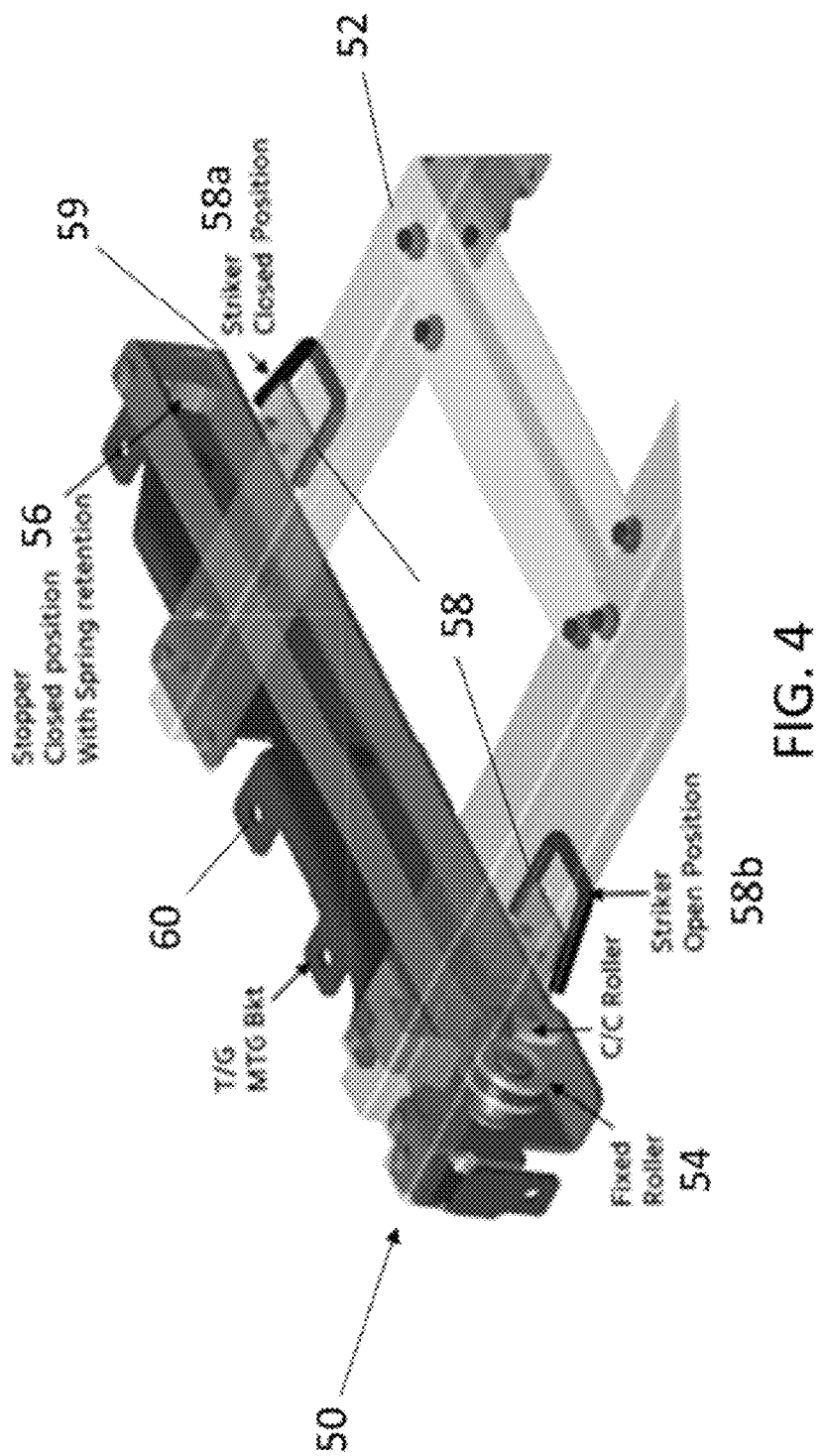
FIG. 4 depicts an example of a drawing representative of a side rai of an upper frame configured to support the tailgate extender.

FIG. 4 depicts an example of a drawing representative of a side rail 52 of an upper frame 50 configured to support the tailgate extender. The side rail may include a fixed roller 54, a stopper 56, strikers 58 (including striker 58a in closed position and striker 58b in open position), and a bracket 60 to secure the tailgate extender.

The side rail 52 may include the fixed roller 54. The fixed roller 54 may be configured to support deployment of the tailgate extender. The fixed roller may rotate as the tailgate extender slides in and out of the side rail. The fixed roller may be positioned at the outer end of the side rails. The fixed roller 54 may be proximate to the portion of the side rail from where the tailgate extender is configured to deploy. The fixed roller 54 may be positioned above the sliding portion of the tailgate extender. The fixed roller may be situated below the rear cross member.

The side rail 52 may include the stopper 56. The stopper 56 may include a spring retention feature configured to dampen movement of the tailgate extender. For example, the stopper 56 may dampen movement of the tailgate extender as the tailgate extender moves to the retracted position. The stopper 56 may be situated proximate to the inner end of the side rails. The stopper 56 may be situated at a portion of the side rails furthest away from where the tailgate extender is configured to deploy.

The side rail may include one or more strikers 58. The one or more strikers 58 may be configured to engage with latches 59 for securing the tailgate extender in the retracted position. Additionally, the striker(s) 58 may be configured to engage with a latch 59 for securing the tailgate extender in the deployed position. In some embodiments, a first striker for securing the tailgate extender in the retracted position may be situated proximate to the inner end of the side rail. The inner end of the side rail may be situated further away from where the tailgate extender is configured to deploy. In some embodiments, a second striker for securing the tailgate extender in the deployed position may be situated proximate to the outer end of the side rail. The outer end may be opposite the inner end on the side rail.

The side rail 52 may include a bracket 60. The bracket may be coupled to the top portion of the side rail. The bracket may mount the side rails to the upper frame.

Figure 5:
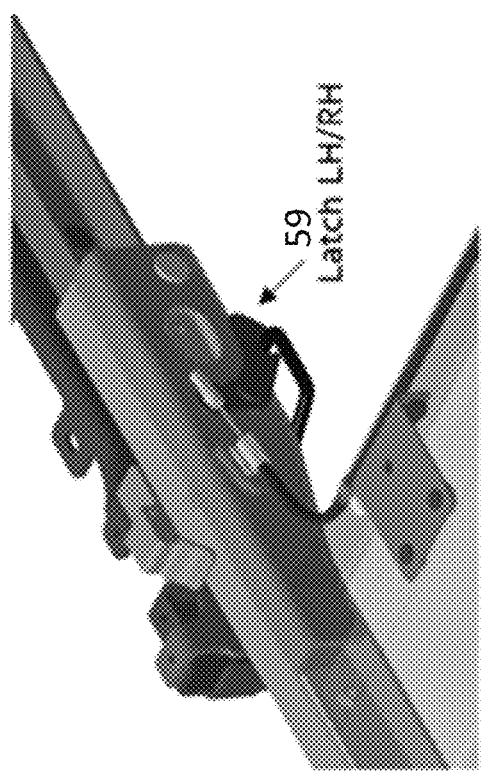
FIG. 5 depicts an example of a diagram representative of a latch of the tailgate extension system.

FIG. 5 depicts an example of a diagram representative of a latch 59 of the tailgate extension system. The latch may be coupled to an end of the tailgate extender. The latch 59 may be configured to latch to a striker 58 at the side rails for securing the tailgate extender in the retracted position and/or the deployed position. The latch may be situated at the portion of the tailgate extender furthest away from where the tailgate extender is deployed. In some embodiments, the latch may be integrated into the tailgate extender. In some embodiments, the latch may be coupled to the outside portion of the tailgate extender at the portion of the tailgate extender furthest away from where the tailgate extender is deployed.

The latch may be configured to slide along with the tailgate extender to selectively couple to the first striker and the second striker of the side rails. For example, the latch may disengage from the first striker and reengage when the tailgate extender reaches the second striker. Engaging the latch with the second striker may secure the tailgate extender in the deployed position. In another example, the latch may disengage from the second striker and reengage when the tailgate extender reaches the first striker. Engaging the latch with the first striker may secure the tailgate extender in the retracted position.

Figure 6:
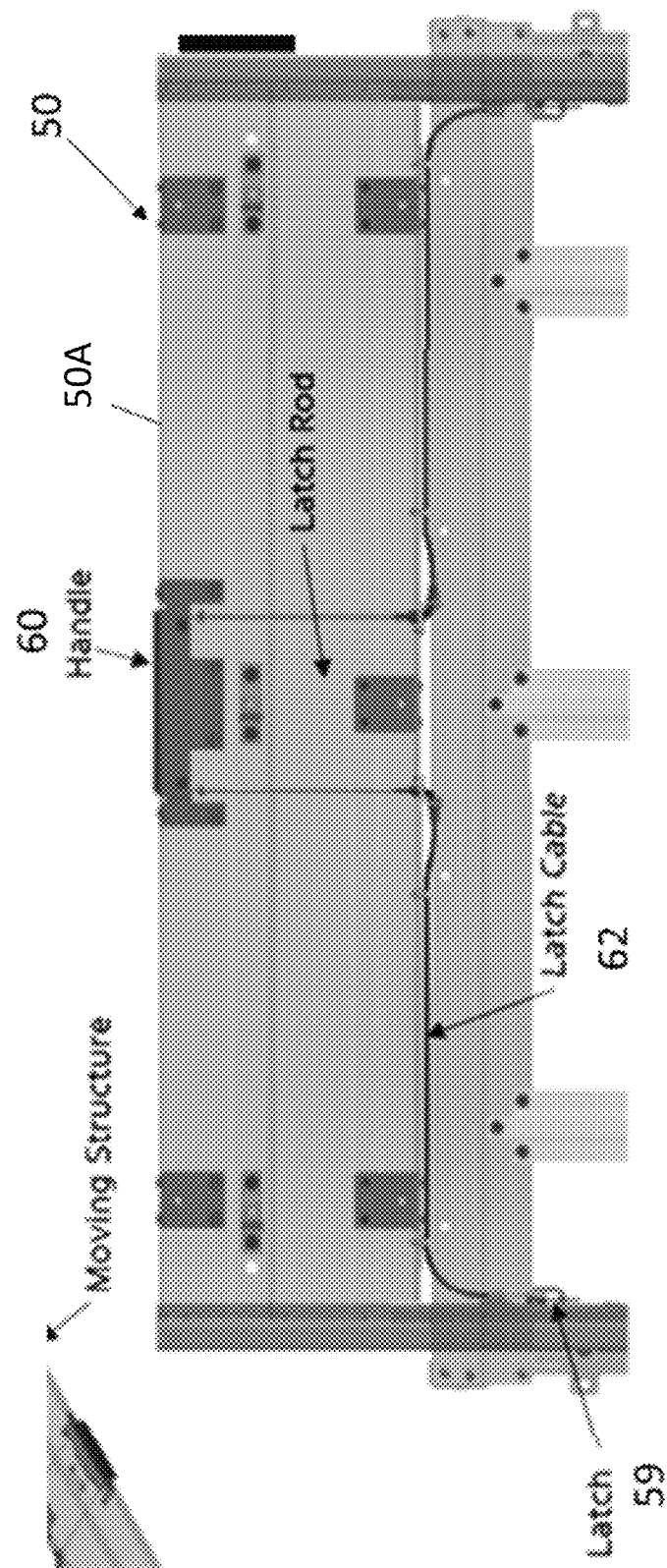
FIG. 6 depicts an example of a diagram representative of a handle connected to a latch via a cable within the tailgate for deploying the tailgate extender.

FIG. 6 depicts an example of a diagram representative of a handle 60 connected to a latch 59 via a cable 62 within the tailgate for deploying the tailgate extender. The handle may be situated at a top portion 50A or end portion of the tailgate extension system 50. The handle may be used to slide the tailgate extender between the retracted position and the deployed position.

The handle 60 may be coupled to a cable 62. The cable may pass through the tailgate extension system to couple with the latch at the end of the tailgate extender. Engaging the handle may cause the cable to be pulled. Pulling the cable may cause the latch to become disengaged from the striker. Disengaging the latch from the first striker or the second striker may allow the tailgate extender to slide freely in and out of the tailgate extension system. For example, pulling the handle when the tailgate is in the retracted position may cause the latch to disengage from the first striker of the side rail and move freely until the latch reengages with the second striker in the deployed position. In another example, pulling the handle when the tailgate is in the deployed position may cause the latch to disengage from the second striker of the side rail and move freely until the latch reengages with the first striker in the retracted position.

Figure 7:
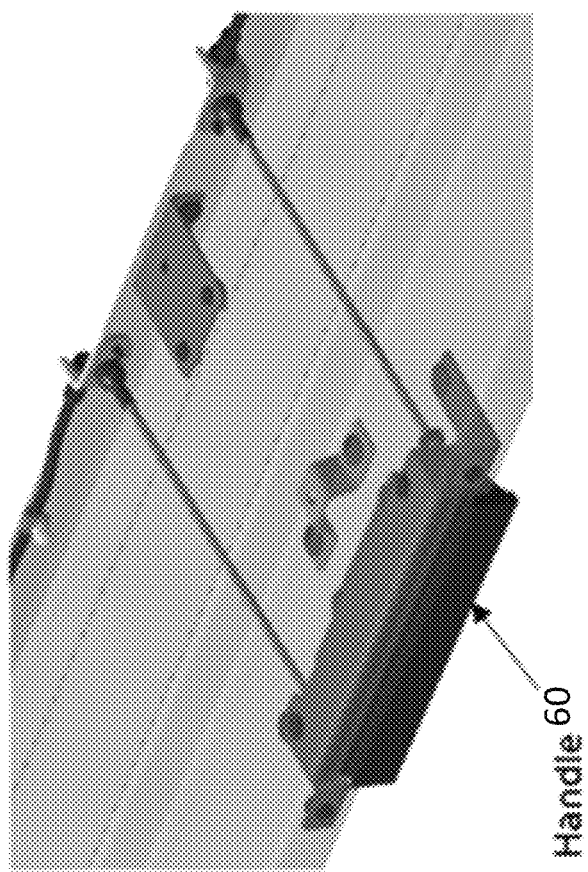
FIG. 7 depicts another view of an example of a drawing representative of a handle for deploying the tailgate extender.

FIG. 7 depicts another view of an example of a drawing representative of a handle 60 for deploying the tailgate extender. The handle may be situated at an end portion of the tailgate extension system when the tailgate is in the open horizontal position. The handle may be used to slide the tailgate extender between the retracted position and the deployed position. The handle may be pulled to disengage the latch from the first striker and the second striker. In some embodiments, a latch rod may be used in the tailgate extender to couple the handle to the cable. The handle may be situated on a top side of the tailgate frame when the tailgate frame is in an upright position.

Figure 8B:
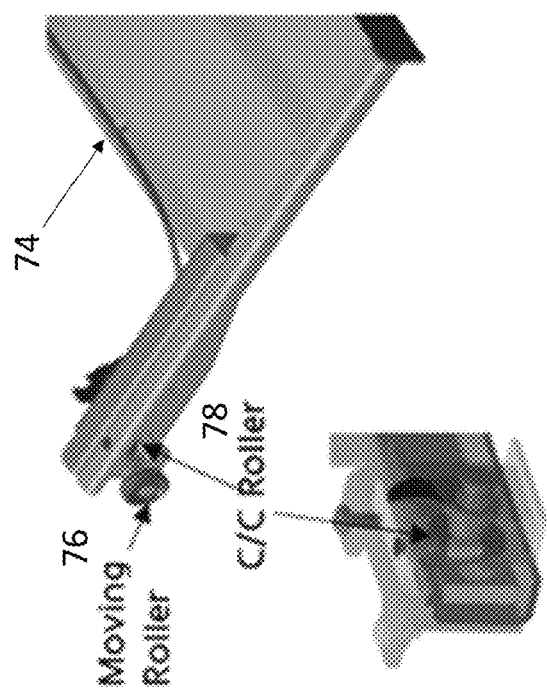
FIG. 8B depicts an example of a diagram representative of a moving roller and a c-channel roller of a tailgate extender.
Figure 8A:
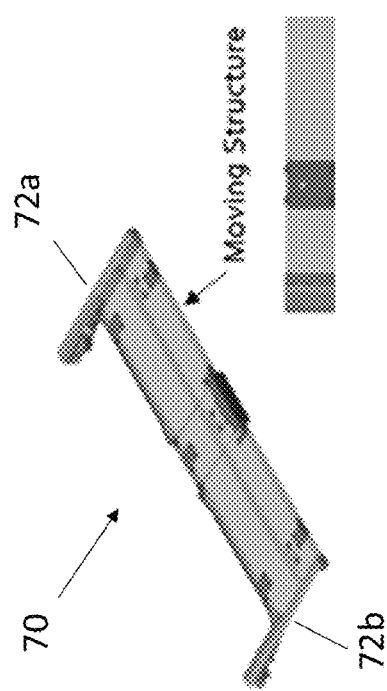
FIG. 8A depicts an example of a diagram representative of a tailgate extender.

FIG. 8A depicts an example of a diagram representative of a tailgate extender 70. The tailgate extender may be configured to deploy from the tailgate frame to extend the tailgate length. The tailgate extender may be supported by the side rails 72a, 72b.

FIG. 8B depicts an example of a diagram representative of a moving roller 76 and a c-channel roller 78 of a tailgate extender 74. The tailgate extender may include a moving roller 76 configured to move along the side rails to deploy the tailgate extender from the tailgate frame. The moving roller may be configured to fit inside the side rails. In some embodiments, the side rails have a c-channel structure for receiving the moving roller. The moving roller may rotate along the c-channel structure to retract and deploy the tailgate extender. In some embodiments, the moving roller may be a c-channel roller.

Figure 9A:
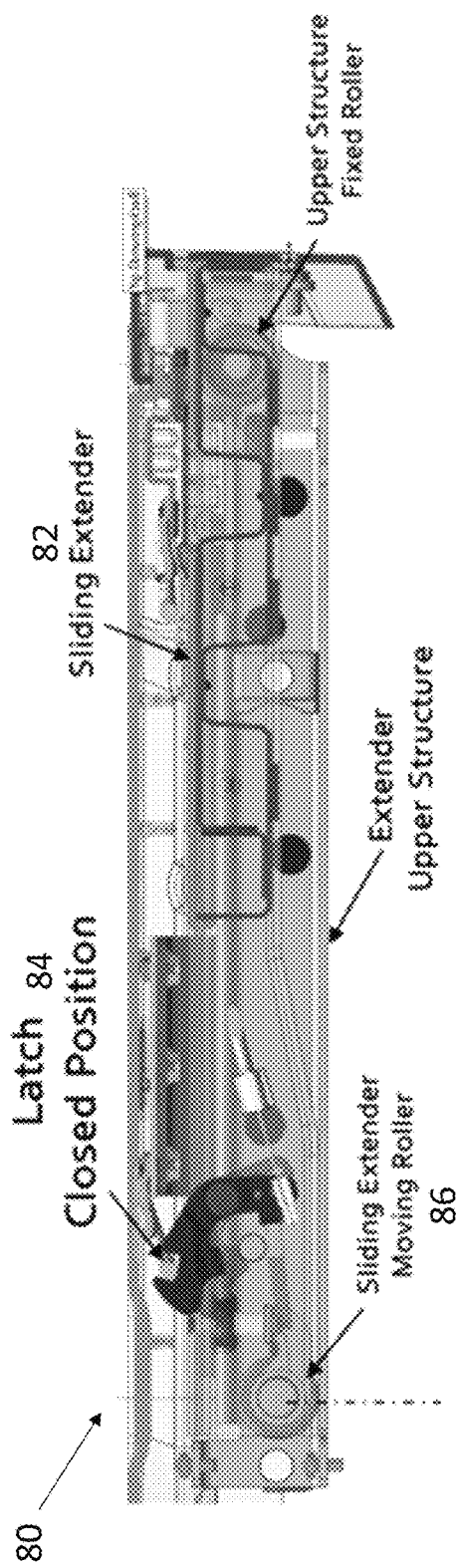
FIG. 9A depicts a side view of an example of a diagram representative of a tailgate extender of the tailgate extension system in the retracted position.

FIG. 9A depicts a side view of an example of a diagram representative of a tailgate extender 82 of the tailgate extension system 80 in the retracted position. In the retracted position, the upper frame and the tailgate extender are enclosed by the tailgate. The latch 84 may be selectively coupled to the first striker. The moving roller 86 may be situated at the inner end of the side rails. The handle may be coupled to a cable configured to disengage the latch in response to the handle being pulled.

Figure 9B:
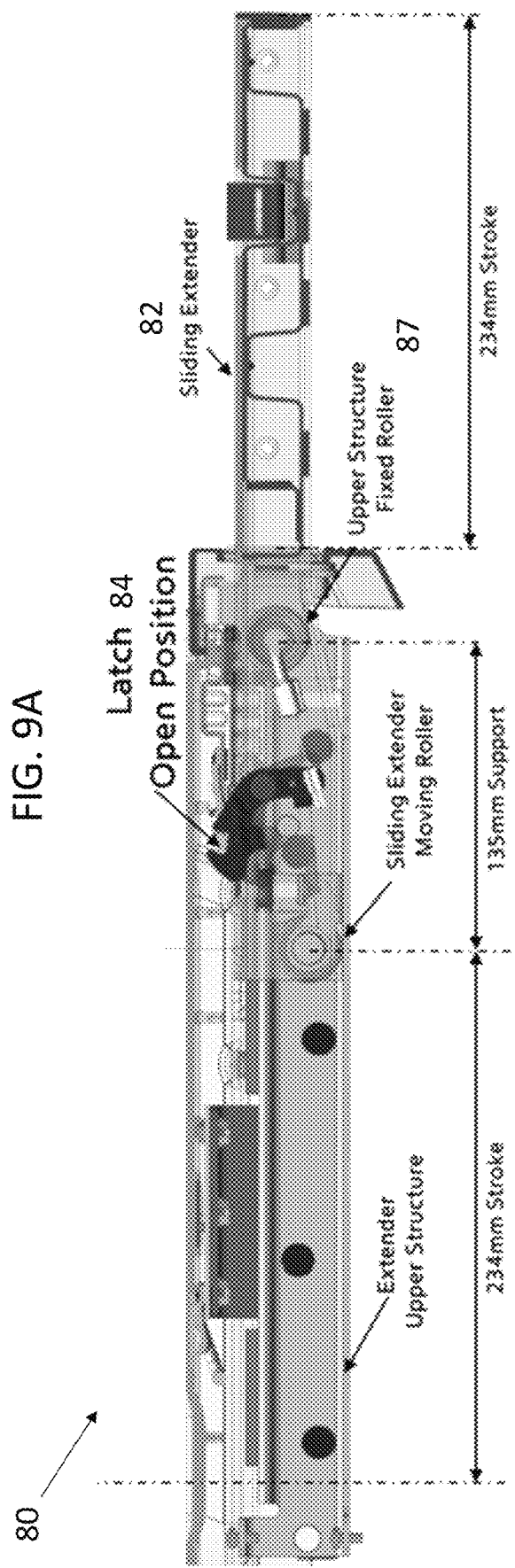
FIG. 9B depicts a side view of an example of a diagram representative of a tailgate extender of the tailgate extension system in the deployed position.

FIG. 9B depicts a side view of an example of a diagram representative of a tailgate extender 82 of the tailgate extension system 80 in the deployed position. In the deployed position, the tailgate extender may be deployed away from an end of the tailgate and the upper frame may be enclosed by the tailgate. The latch 84 may be selectively coupled to the second striker. The moving roller may be situated at the outer end of the side rails. The fixed roller 87 may remain unmoved while deploying the tailgate extender.

Figure 10:
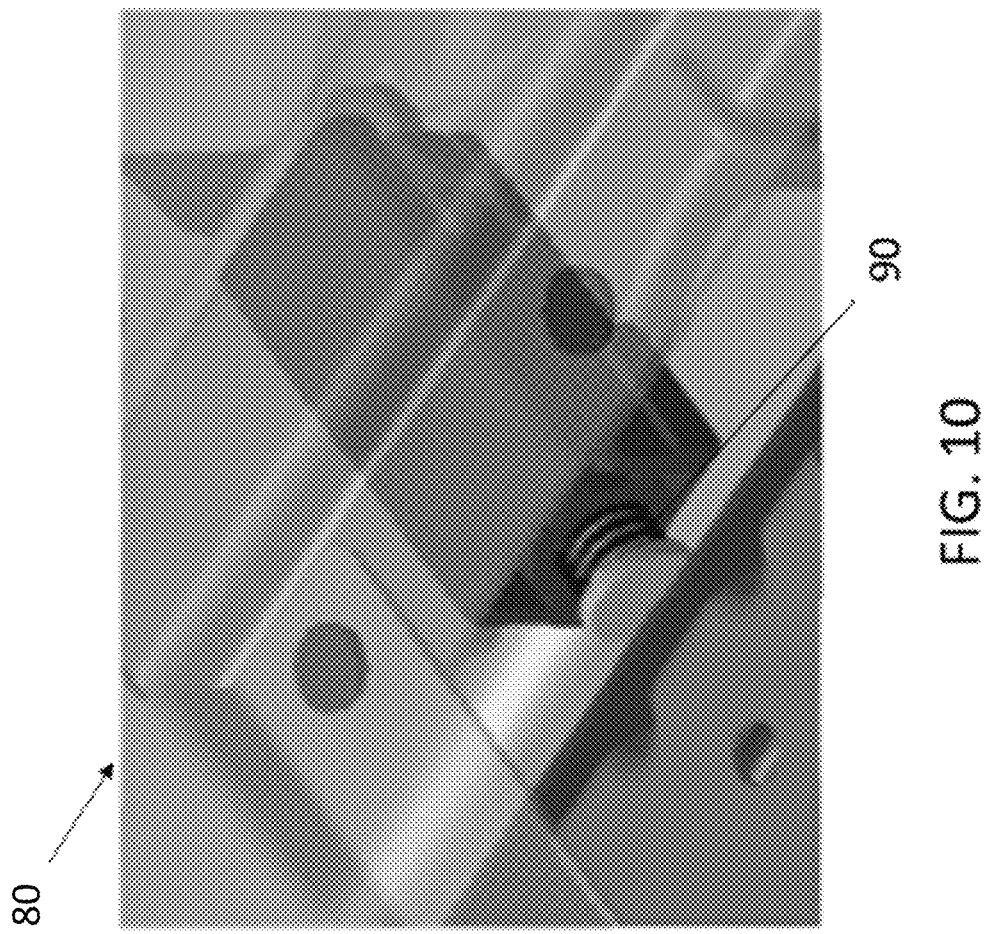
FIG. 10 depicts an example of a diagram representative of a pop-up spring of the tailgate extension system.

FIG. 10 depicts an example of a diagram representative of a pop-up spring 90 of the tailgate extension system 80. The pop-up spring may be configured to exert a force on the tailgate extender to move the tailgate. The pop-up spring may be configured to move the tailgate extender a distance in response to pulling on the handle. The handle may be connected to the pop-up spring via cables. The pop-up spring may facilitate easy movement of the tailgate extender. The pop-up spring may be located under the upper frame and near the inner portion of the tailgate. In some embodiments, the pop-up spring may be proximate to the inner end of the side rail. The head of the pop-up spring may be aligned against the portion of the tailgate extender furthest from where the tailgate extender is configured to be deployed. The head of the pop-up spring may exert force against the tailgate extender in the direction towards where the tailgate extender is configured to be deployed.

Figure 11:
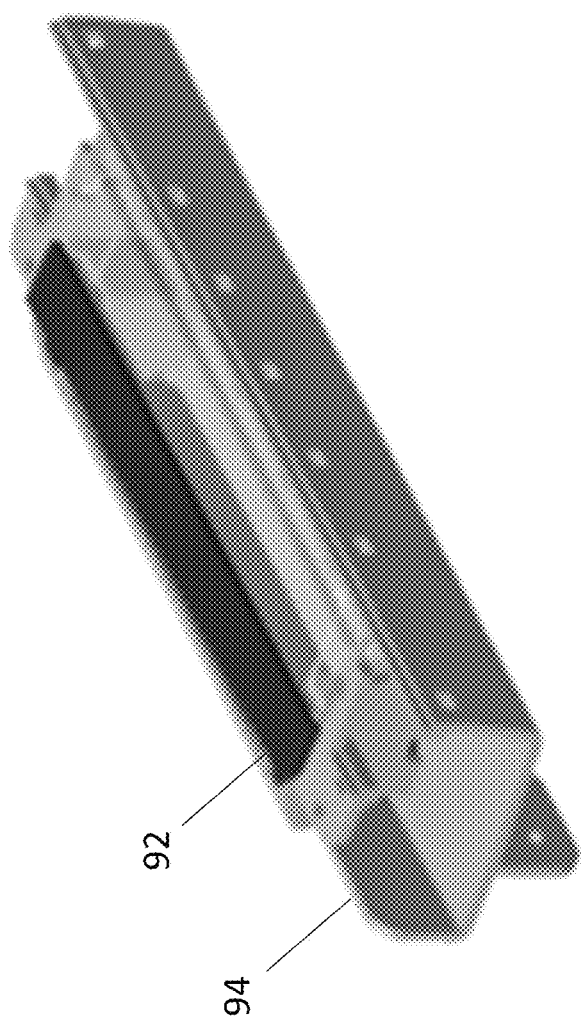
FIG. 11 depicts an example of a diagram representative of a lid for a handle casing.

FIG. 11 depicts an example of a diagram representative of a lid 92 for a handle casing 94. The handle casing may cover the cavity below and behind the handle. The lid may be configured to prevent snow, dust, and water accumulation at the handle and handle casing. The handle casing may be configured to control water entry and exit at the tailgate extension system.

Figure 12:
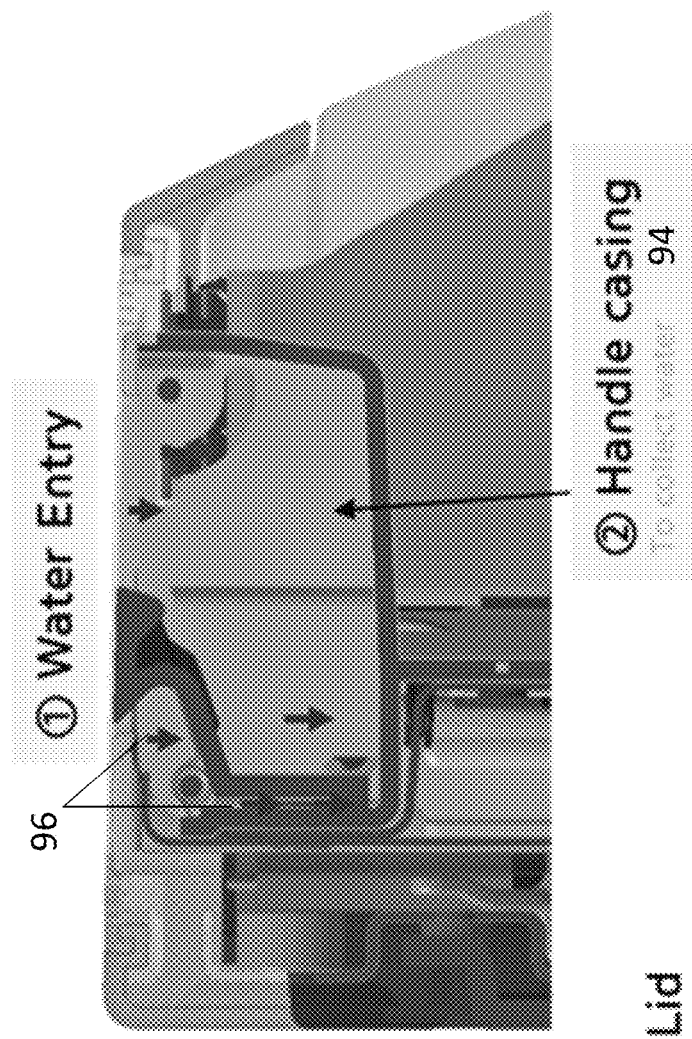
FIG. 12 depicts an example of a diagram representative of a handle casing for providing multiple drain paths for controlled water management.

FIG. 12 depicts an example of a diagram representative of a handle casing 94 for providing multiple drain paths 96 for controlled water management. The handle casing may include runoff channels for controlling how the handle casing collects water as the water enters into the tailgate extension system.

Figure 13:
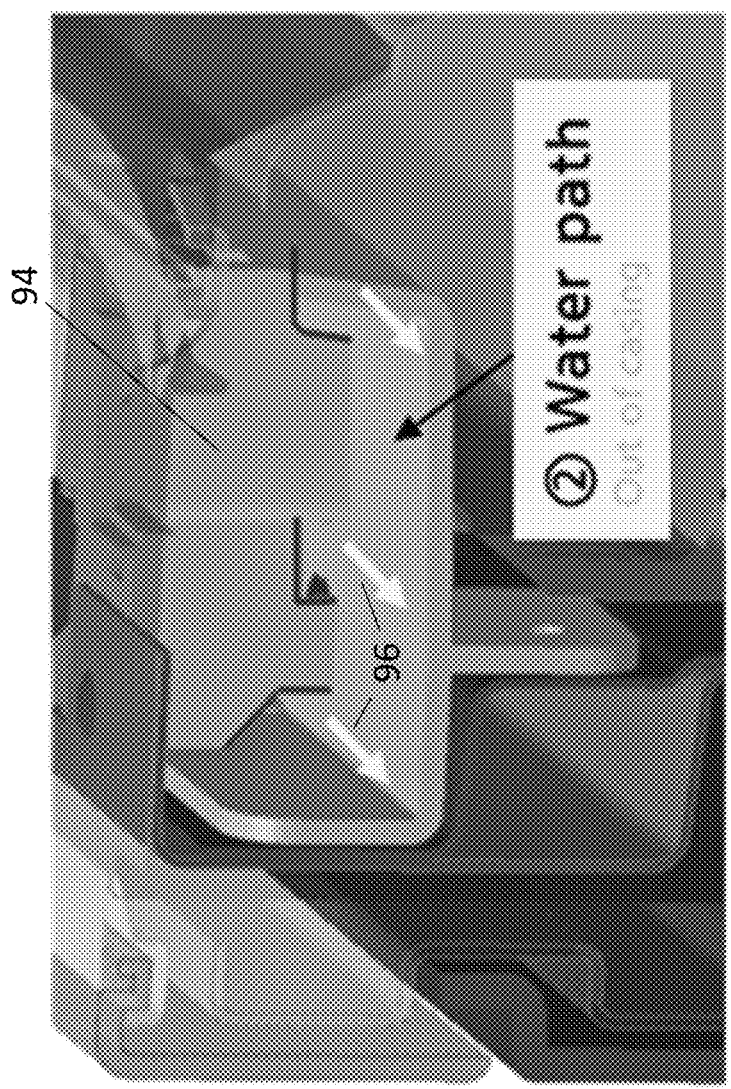
FIG. 13 depicts another example of a diagram representative of a handle casing for providing multiple drain paths for controlled water management.

FIG. 13 depicts another example of a diagram representative of a handle casing 94 for providing multiple drain paths 96 for controlled water management. The handle casing may include runoff channels for controlling how the water exits the tailgate extension system.

Figure 14:
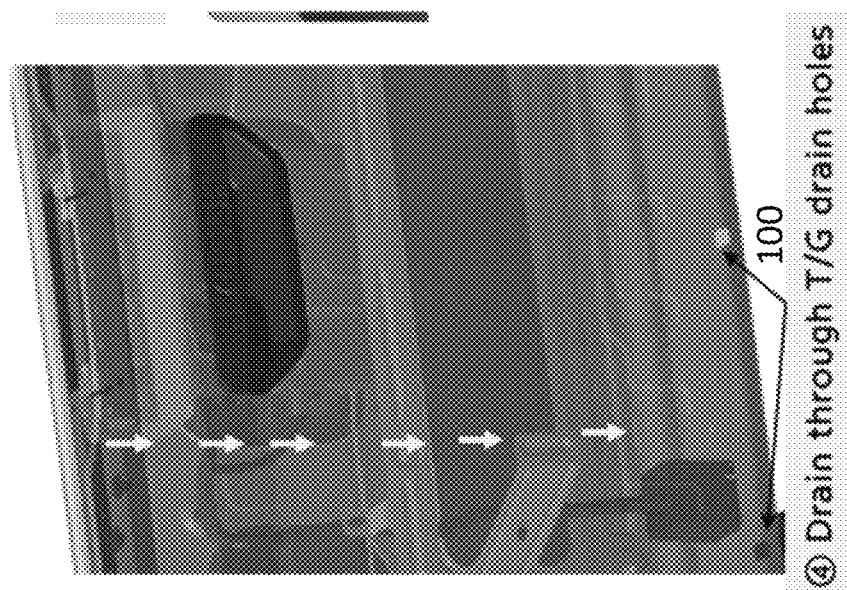
FIG. 14 depicts another example of a diagram representative of tailgate holes for providing multiple drain paths for controlled water management.

FIG. 14 depicts another example of a diagram representative of tailgate holes 100 for providing multiple drain paths for controlled water management. The tailgate may include channels through which the water exiting the handle casing may pass through the tailgate and exit through the tailgate holes.

The technical advantages include extending the length of the vehicle bed. The tailgate extension device allows a vehicle to carry cargo that exceeds the dimensions of the vehicle bed with the tailgate in the upright position. The tailgate extension system includes the tailgate extender that extends out past the end of the tailgate. The tailgate extender may support a load having dimensions that exceed the dimensions of the vehicle bed with the tailgate in an upright position. In comparison to typical tailgates, the tailgate extension system may increase the size of the vehicle bed and may support heavy loads.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A tailgate extension system for extending a tailgate length, the tailgate extension system comprising:
   a tailgate frame configured to fold down to an open position;
   a tailgate extender configured to deploy from the tailgate frame, the tailgate extender comprising a roller unit configured to deploy the tailgate extender from the tailgate frame;
   wherein the tailgate extender further comprises a handle coupled to a cable configured to disengage a latch in response to t e handle being pulled.

2. A tailgate extension system for extending a tailgate length, the tailgate extension system comprising:
   a tailgate frame configured to fold down to an open position;
   an upper frame integrated into the tailgate frame, the upper frame including a cross member having a first end and a second end, the cross member configured to extend across the tailgate frame from the first end to the second end;

at least one side rail configured to couple to at least one of the first end and the second end of the cross member, the at least one side rail oriented approximately perpendicular to the cross member; and a tailgate extender configured to deploy from the tailgate frame to extend the tailgate length, the tailgate extender configured to be supported by the at least one side rail and including a moving roller configured to move along the at least one side rail to deploy the tailgate extender from the tailgate frame.

3. The tailgate extension system of claim 2, wherein the tailgate extender is configured to extend out of the tailgate frame as the moving roller moves along the at least one side rail.

4. The tailgate extension system of claim 3, wherein the at least one side rail includes a fixed roller configured to support deployment of the tailgate extender, the fixed roller being positioned at an outer end of the at least one side rail closest to where the tailgate extender is configured to deploy.

5. The tailgate extension system of claim 2, wherein the tailgate extender further comprises:
a latch for securing the tailgate extender to the at least one side rail in a deployed position and a retracted position.

6. The tailgate extension system of claim 5, wherein the at least one side rail further comprises:
a first striker configured to engage with the latch for securing the tailgate extender to the at least one side rail in the retracted position, the first striker situated at an inner end of the at least one side rail, the inner end situated further away from where the tailgate extender is configured to deploy.

7. The tailgate extension system of claim 6, wherein the at least one side rail further comprises:
a second striker configured to engage with the latch to secure the tailgate extender in the deployed position, the second striker being situated proximate to an outer end of the at least one side rail, the outer end opposite the inner end on the at least one side rail; and
a stopper with a spring retention feature configured to dampen movement of the tailgate extender as the tailgate extender moves to the retracted position, the stopper being situated proximate to the inner end of the at least one side rail.

8. The tailgate extension system of claim 2, wherein the at least one side rail has a c-channel structure configured to receive the moving roller coupled to the tailgate extender.

9. The tailgate extension system of claim 2, wherein the upper frame further comprises:
a rear cross member configured to extend from the first end to the second end of the cross member; and
at least one internal beam configured to couple the cross member to the rear cross member,
wherein the rear cross member is configured to couple to the at least one side rail.

10. The tailgate extension system of claim 2, further comprising:
a pop-up spring configured to exert a force on the tailgate extender to move the tailgate extender a distance in response to pulling on a handle when the tailgate frame is folded down in the open position.

11. The tailgate extension system of claim 2, wherein the at least one side rail further comprises:

a bracket for mounting the at least one side rail to the upper frame.

12. The tailgate extension system of claim 1, wherein the cable is configured to disengage the latch from a pin in response to the handle being pulled.

13. The tailgate extension system of claim 1, wherein the handle is situated on a top side of the tailgate frame when the tailgate frame is in an upright position.

14. The tailgate extension system of claim 1, further comprising:
a lid configured to prevent at least one of snow, dust, and water accumulation at the handle; and
a handle casing configured to control water entry and exit at the tailgate extension system.

15. A tailgate extension device for extending a tailgate length, the tailgate extension device comprising:
an upper frame configured to be integrated into a tailgate frame, the upper frame including a cross member having a first end and a second end;
at least one side rail configured to couple to at least one of the first end and the second end of the cross member, the at least one side rail oriented approximately perpendicular to the cross member; and
a tailgate extender configured to deploy from the upper frame, the tailgate extender configured to be supported by the at least one side rail and including a moving roller configured to move along the at least one side rail to deploy from the upper frame.

16. The tailgate extension device of claim 15, wherein the tailgate extender is configured to extend out of the upper frame as the moving roller moves along the at least one side rail.

17. The tailgate extension device of claim 16, wherein the at least one side rail includes a fixed roller configured to support deployment of the tailgate extender, the fixed roller being positioned at an outer end of the at least one side rail closest to where the tailgate extender is configured to deploy.

18. The tailgate extension device of claim 15, wherein the tailgate extender further comprises:
a) a latch for securing the tailgate extender to the at least one side rail in a deployed position and a retracted position; and/or
b) a first striker configured to engage with the latch for securing the tailgate extender to the at least one side rail in the retracted position, the first striker situated at an inner end of the at least one side rail, the inner end situated further away from where the tailgate extender is configured to deploy; and/or
c) a second striker configured to engage with the latch to secure the tailgate extender in the deployed position, the second striker being situated proximate to an outer end of the at least one side rail, the outer end opposite the inner end on the at least one side rail; and/or
d) a stopper with a spring retention feature configured to dampen movement of the tailgate extender as the tailgate extender moves to the retracted position, the stopper being situated proximate to the inner end of the at least one side rail.

19. A vehicle comprising the tailgate extension system of claim 2.

* * * * *